Patented Feb. 24, 1931

1,793,677

UNITED STATES PATENT OFFICE

LUIGI CASALE, DECEASED, LATE OF ROME, ITALY, BY MARIA CASALE-SACCHI, ADMINISTRATRIX, OF RAPALLO, GENOA, ITALY

PROCESS FOR THE PRODUCTION OF HYDROGEN

No Drawing. Application filed June 22, 1927, Serial No. 200,776, and in Italy June 25, 1926.

Among the various processes hitherto used for the production of hydrogen, only the electrolytic offers a very pure product, all the other processes giving a product which always requires a purification frequently difficult and costly.

Now it is known that the so called catalytic substances show a great facility to reduce their activity or to lose it entirely when they are brought in contact with even smallest traces of certain impurities which are called poisons, and it is therefore obvious that in the processes of synthesis the reacting substances must possess a high degree of purity.

This invention relates to the production of hydrogen—the application of which is ever increasing in various and important catalytic processes—by means of an easy process.

A known process for the production of hydrogen consists in treating water-gas catalytically. The process occurs as follows:

Water-gas, prepared with known processes, and which usually contains about 50% of hydrogen and 40% of carbon monoxide, is passed together with steam over catalyzers (generally iron, its oxides or metals of the iron group) and in suitable conditions of temperature, so that hydrogen and carbon dioxide are formed, the hydrogen being easily separated from the carbon dioxide.

The reactions which occur are:

(1) $C + H_2O = CO + H_2 - 28,300$ cal.
(2) $CO + H_2O = CO_2 + H_2 + 10,100$ cal.

The process, however, offers some drawbacks. In the first place the preparation of water-gas with an ordinary process is not continuous, but intermittent; moreover the hydrogen obtained by catalyzing the water-gas contains always sulphuretted hydrogen and variable amounts of hydrocarbons, nearly essentially consisting of methane, which is therefor evolved partly from the fuel, and partly formed during the water-gas production stage on account of the great quantity of hydrogen issuing from the water. The hydrocarbons do not show a dangerous activity toward the catalytic substances, but have the drawback of accumulating in the catalytic cycles, so that their elimination becomes necessary. The sulphuretted hydrogen, on the contrary, is a gas which is poisonous to the catalysts which are used in the various catalytic processes in which the hydrogen participates and it can also greatly reduce the activity of the material employed in the catalysis of hydrogen from water-gas. Its complete removal offers great difficulties, as may be gathered from the great number of processes proposed and patented.

All these drawbacks are avoided in accordance with this invention by operating as follows:

A gaseous mixture consisting of carbon dioxide and oxygen is passed over red hot coal in such proportions that the reaction becomes exothermic. For example, one can effect the following reaction:

$$3C + CO_2 + O_2 = 4CO + 21,000 \text{ cal.}$$

For the purpose of reducing to a minimum possible the quantity of carbon dioxide in equilibrium with the carbon monoxide, it is advantageous to make the reaction occur at the highest temperature possible, e. g. at above 1000° C. The carbon dioxide in equilibrium with the carbon monoxide at 1000° C. is in fact only in the proportion of 0.9% (see Boudouard, Z. angew. Chem. 1900, 812). At this temperature the small quantities of methane and other hydrocarbons which may be present are decomposed into carbon and hydrogen.

By operating in this manner the sulphur present in the fuel is oxidized to sulphurous anhydride, owing to the absence of hydrogen in the atmosphere of the carbon monoxide generator. In this manner one obtains at last a mixture consisting of carbon monoxide together with small quantities of carbon dioxide and sulphurous anhydride, which are then easily removed by absorption, e. g. in calcium or sodium hydroxide.

The carbon monoxide, free from said impurities, is ready for the catalysis of the steam, and the carbon dioxide formed according to Reaction 2 can be recovered and partially serve for again effecting the reaction for production of carbon monoxide.

One of the most important features of the present invention resides in the sequence of steps just described. That is to say, to react coal containing sulphur with carbon dioxide and oxygen to form carbon monoxide and sulphur dioxide and remove the sulphur dioxide before treating the carbon monoxide with steam in the presence of a catalyst. Following this sequence of steps, no difficulty is encountered in removing sulphur compounds from the gas since sulphur dioxide is readily absorbed in alkaline solutions. In prior processes, it is the customary practice to react the carbon monoxide at once with steam and, as a result thereof, the sulphur dioxide in the carbon monoxide, is converted to hydrogen sulphide by the hydrogen formed as one of the products of the reaction. It is difficult, if not impossible, to remove traces of hydrogen sulphide from a gaseous mixture and alkaline solutions are ineffective. This is because all sulphides hydrolyze to some extent and an alkaline sulphide solution always has an appreciable vapor pressure of hydrogen sulphide thus indicating that this gas cannot be completely removed by alkalies.

As stated, this process removes sulphur impurities in the carbon monoxide gas as readily removable sulphur dioxide and the process is therefore characterized by removing the gaseous sulphur compounds from the carbon monoxide before it is catalyzed with steam. This sequence of steps also permits the use of cheaper sources of carbon, such as high sulphur coals because the order of process steps precludes any difficulties with sulphur removal from the ultimate hydrogen produced.

Comparing the thermic effects of the reaction for production of water gas with the thermic effects of the reaction which is now suggested for producing carbon monoxide, and bearing in mind that in the reaction in accordance with this invention steam does not participate, it is clear that, besides the above advantages, the present process possesses a considerable economical superiority compared with the process from the water-gas.

This invention is not limited to the cycle of operations above shown, because the process could be executed also intermittently, e. g. gasifying the fuel with carbon dioxide only, and in this case the reaction is endothermic and it is necessary to alternate the passage of the carbon dioxide over the fuel with injections of air in manner of maintaining the combustion.

The combustion can further be executed using a mixture of nitrogen and carbon dioxide, so as to obtain a mixture of nitrogen, oxygen and hydrogen in the required ratio for the synthesis of ammonia.

What is claimed is:

1. An improved process for the production of hydrogen suitable for catalytic syntheses, which comprises passing a gaseous mixture of carbon dioxide and oxygen over red hot coal containing sulphur, in such proportions that an exothermic reaction takes place and carbon monoxide is formed the temperature of the reaction being at least 1000° C., passing the resulting gaseous mixture through an alkaline solution to remove sulphur dioxide, and thereafter converting the carbon monoxide thus obtained into carbon dioxide by the action thereon of steam in the presence of a catalyst to form a mixture of carbon dioxide and hydrogen, and passing said mixture through an absorbent for carbon dioxide.

2. An improved process for the production of hydrogen free from impurities of the kind that act as catalyst poisons in catalytic syntheses employing hydrogen, which comprises passing a gaseous mixture containing carbon dioxide and oxygen, over a carbonaceous fuel containing sulphur and methane at an elevated temperature whereby the carbon dioxide is reduced to carbon monoxide, the sulphur oxidized to sulphur dioxide and the methane decomposed to carbon and hydrogen, and thereafter removing the impurities from the carbon monoxide thus obtained, catalyzing the purified carbon monoxide with steam to produce a mixture of hydrogen and carbon dioxide and removing the carbon dioxide.

3. In the production of hydrogen suitable for catalytic syntheses by conversion of carbon dioxide with oxygen into carbon monoxide in the presence of a carbonaceous fuel containing sulphur, subsequently converting the carbon monoxide by the action of steam in the presence of a catalyst to produce a mixture of carbon dioxide and hydrogen and finally removing the carbon dioxide, the steps which comprise the conversion of the carbon dioxide into carbon monoxide at a temperature high enough to effect the oxidation of any contained sulphur into sulphur dioxide and thereafter removing the sulphur dioxide from the carbon monoxide before further treatment of the carbon monoxide takes place.

4. In the production of hydrogen suitable for catalytic syntheses by conversion of carbon dioxide with oxygen into carbon monoxide in the presence of a carbonaceous fuel containing sulphur, subsequently converting the carbon monoxide by the action of steam in the presence of a catalyst to produce a mixture of carbon dioxide and hydrogen and finally removing the carbon dioxide, the steps which comprise the conversion of the carbon dioxide into carbon monoxide by an exothermic reaction at a temperature of at least 1000° C., and thereafter passing the resultant gaseous mass through an absorbent for sulphur dioxide before proceeding with the conversion of the carbon monoxide back into carbon dioxide by means of steam.

MARIA CASALE-SACCHI,
*Administratrix of Luigi Casale, Deceased.*